(No Model.) 4 Sheets—Sheet 1.

W. M. MORDEY.
DYNAMO ELECTRIC MACHINE.

No. 493,104. Patented Mar. 7, 1893.

Witnesses
W. Cross
L. S. Fiducia

Inventor
W. M. Mordey (No Model.) 4 Sheets—Sheet 2.

W. M. MORDEY.
DYNAMO ELECTRIC MACHINE.

No. 493,104. Patented Mar. 7, 1893.

Witnesses
W. Cross
DS. Fiducia

Inventor
W. M. Mordey.

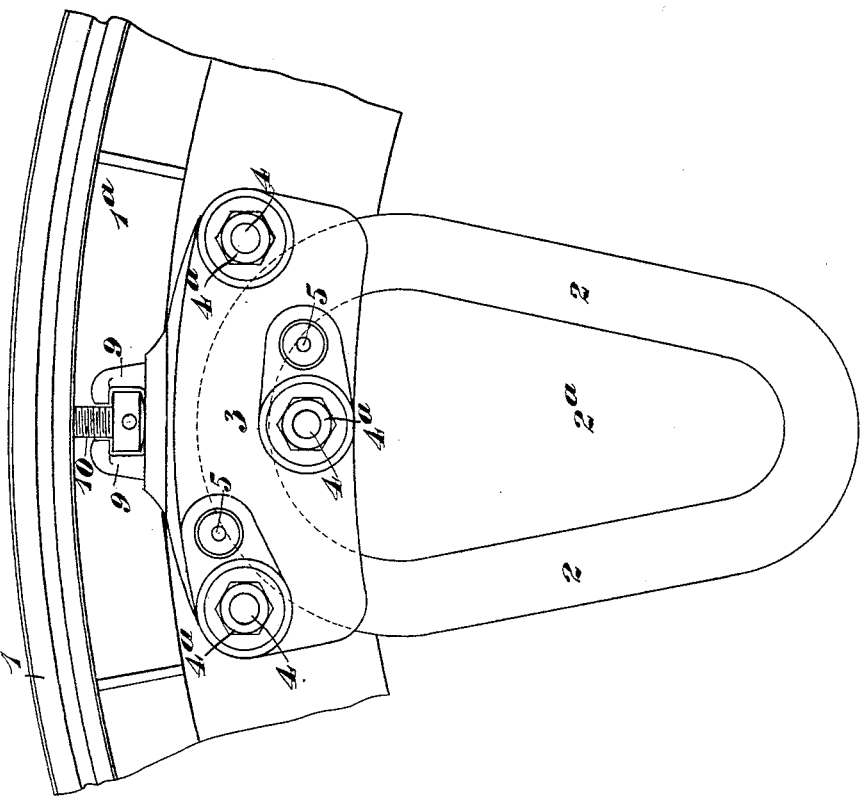
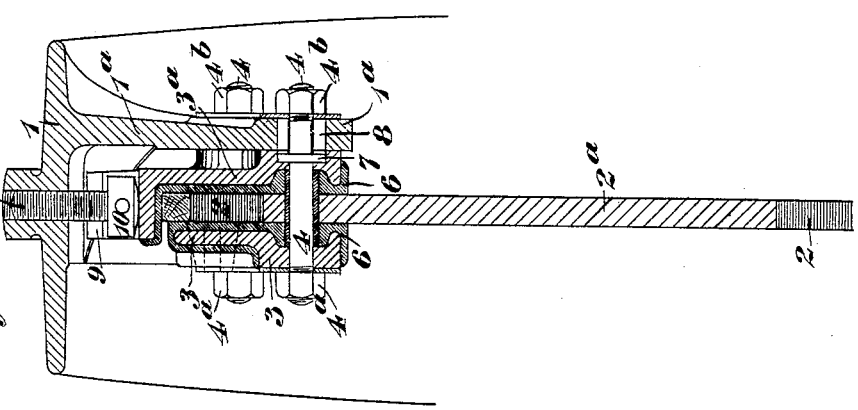

(No Model.)  
4 Sheets—Sheet 4.

W. M. MORDEY.
DYNAMO ELECTRIC MACHINE.

No. 493,104. Patented Mar. 7, 1893.

Witnesses  
W. Cross  
AS. Fiducia

Inventor  
W. M. Mordey

UNITED STATES PATENT OFFICE.

WILLIAM MORRIS MORDEY, OF LONDON, ENGLAND.

DYNAMO-ELECTRIC MACHINE.

SPECIFICATION forming part of Letters Patent No. 493,104, dated March 7, 1893.

Application filed April 28, 1891. Serial No. 390,861. (No model.)

*To all whom it may concern:*

Be it known that I, WILLIAM MORRIS MORDEY, a subject of the Queen of Great Britain and Ireland, residing at Lambeth, London, in the county of Surrey, England, have invented Improvements in Dynamo-Electric Machines, of which the following is a specification.

My invention has reference to dynamo electric machines of the type in which an armature having an annular series of coils is arranged between two series of magnetic poles or polar extensions as for example in a dynamo electric machine of the kind described in the specification of another application for United States Letters Patent filed by me dated April 21, 1891, Serial No. 389,819. In such machines there is used in conjunction with an armature consisting of an annular series of coils without iron cores, a field magnet having a single magnetizing coil or winding and formed with two series of polar extensions arranged at opposite sides of the armature coils, one series of these polar extensions being of opposite polarity to the other series.

Now my present invention relates to improvements in the details of construction of such machines and to the mode of supporting and arranging the armature coils, all as will be hereinafter more particularly described and pointed out in the claims.

Figure 1:
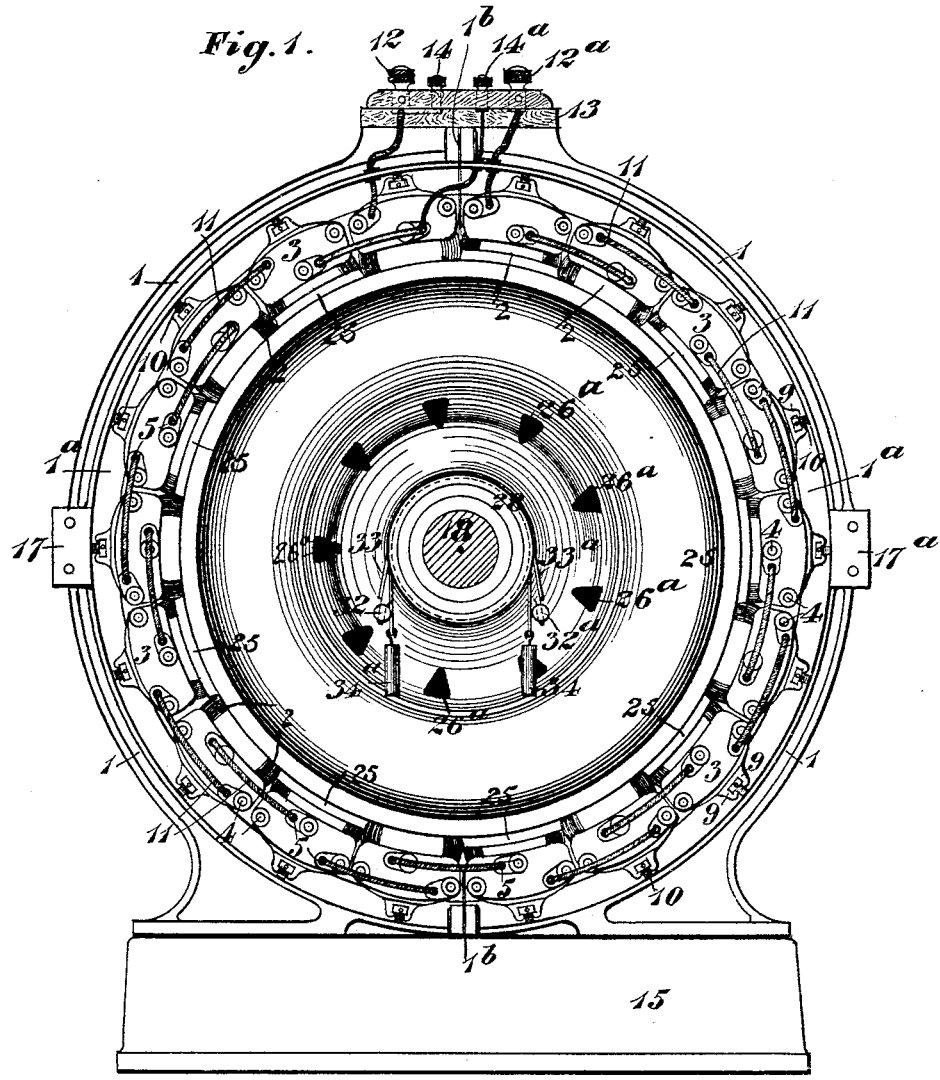
Figure 2:
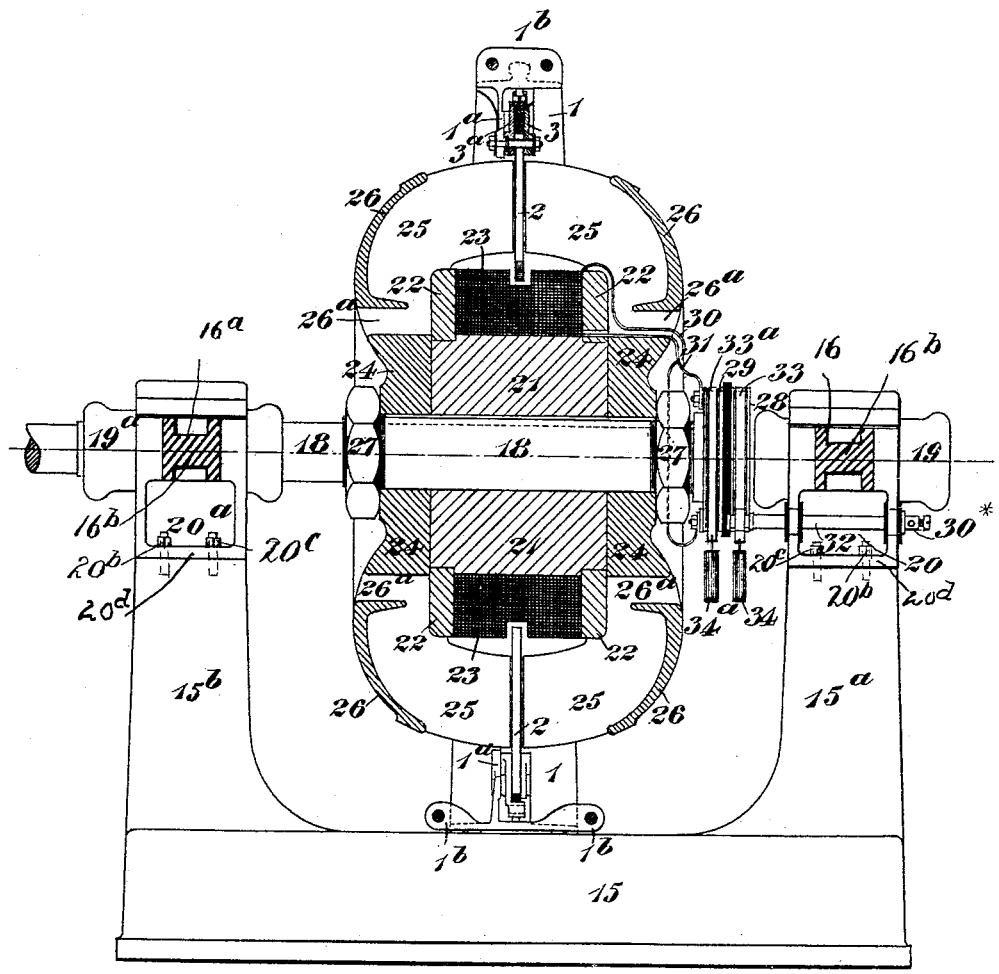
Figure 5:
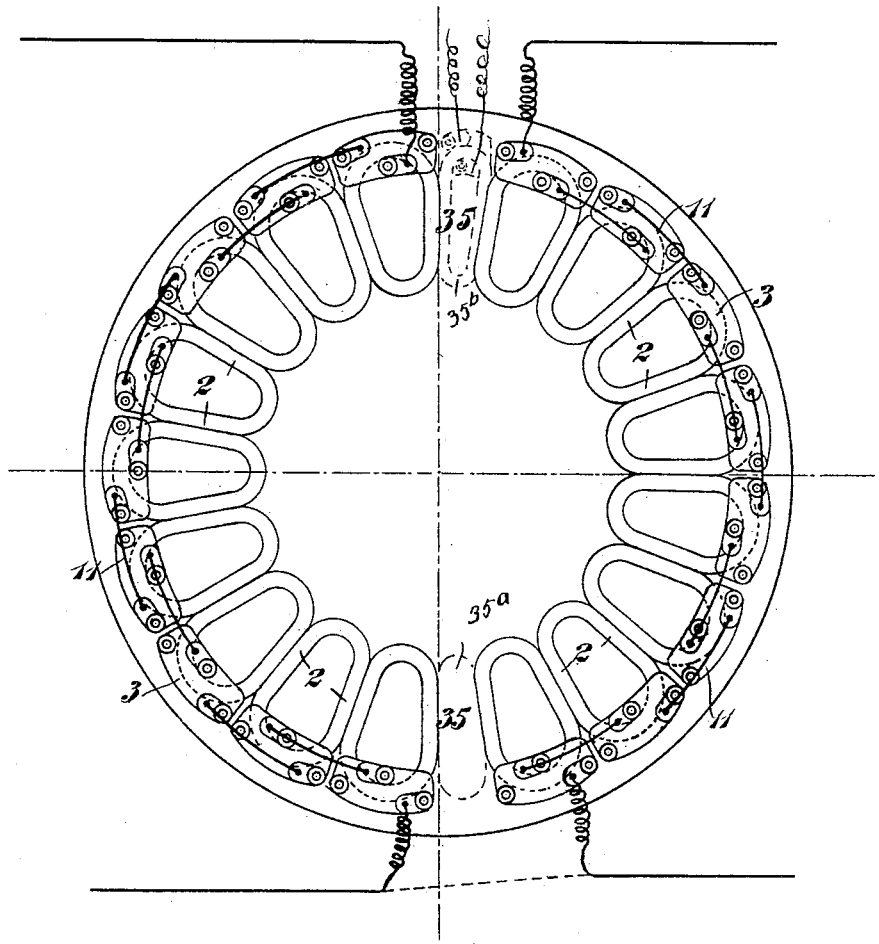

In the accompanying drawings. Figure 1 is an end elevation of an alternate current dynamo electric machine, or alternator, constructed according to this invention, certain supporting parts being removed for the sake of clearness. Fig. 2 is a longitudinal elevation, partly in section. Figs. 3 and 4 show in detail, the construction and mode of supporting one armature coil, Fig. 3 being a longitudinal section, and Fig. 4 a full side view. Fig. 5 is a diagrammatic view showing modified arrangements of the armature coils.

Referring to Figs. 1 to 4 inclusive, 1 is the armature supporting frame or ring. It is preferably made of some metal or alloy that is non-magnetic and of high specific electrical resistance. To give it rigidity in both directions it is made of the section shown in Fig. 3 wherein it is shown as a rim with an inner flange or web $1^a$ to which the armature coils 2, 2 are secured as hereinafter described. Each of these coils 2 is held between two plates 3, $3^a$ by bolts 4, 4 in the following manner. Each plate is formed with three holes for the three bolts 4, 4, 4 the front plate 3 having also two additional holes 5, 5, lined with insulating bushes, through which the ends of the conductor constituting the coil 2 are brought.

In high tension armatures the plates 3, $3^a$ are covered or protected on their inner surfaces, and also to a certain extent on their outer surfaces, with an insulating substance. For this purpose I prefer to partly or wholly embed these plates in layers 6 of suitable insulating material as for example ebonite, put on in a plastic state, and vulcanized. This secures good insulation and prevents surface leakage. Each of the bolts 4 (one of which is fully shown in Fig. 3), is provided with a collar or shoulder 7. To secure the coil between the plates 3, $3^a$, the bolts 4 are first passed through their respective holes in the plates, and the nuts $4^a$ then screwed up tight, thereby firmly holding the coil in place between the plates. Each coil so held is then ready to be mounted on the ring 1. To enable this to be done, the flange $1^a$ is provided with radially slotted holes 8, through which are passed the short ends of the bolts 4 that project beyond the plate $3^a$. A nut $4^b$ is then screwed on to the end of each of the said bolts, thus firmly holding the plates and coil against the turned face of the flange $1^a$. The complete armature is made up by mounting on the ring 1 in the manner described the proper number of armature coils. In order that the coils may be readily put exactly in their proper radial positions, and also to enable any coil to be easily and quickly taken out or put in place laterally, and especially for the purpose of rendering it easy to so mount the coils that they may mutually support one another and so form a strong structure and prevent looseness or vibration, the following arrangement is adopted. The outer periphery of the plate $3^a$ of each coil is formed with two recessed projections 9. The ring 1 has a number of radial holes drilled and tapped to correspond in position with the middle of each of the coils. For each coil a screw 10 (or screws) is screwed into the ring, this screw being so arranged that its head enters within the recess between the projections 9. When placing a coil 2 in position, it is first put as far out radially as it will go, the nuts 4ᵇ being at this time loose on the bolts 4. The screw 10 is then turned until the coil is forced radially inward to its proper position. The nuts 4ᵇ are then tightened up, finally securing the coil in place. Each armature coil 2 is formed of copper ribbon wound with the requisite number of turns, a ribbon of suitable insulating material being wound between the turns. The space within each coil is sometimes left blank, and sometimes filled with a core 2ª of a non-metallic substance such as slate, porcelain, marble or glass.

The armature supporting ring 1 is divided at its vertical diameter into two equal portions which are bolted together at the points of junction 1ᵇ.

In the particular armature shown in Figs. 1 and 2, there are eighteen armature coils, equally spaced around the ring, these coils being shown in front view in Fig. 1 except those parts thereof which are hidden by the field magnet. The several coils are shown electrically connected in series by the connecting conductors 11 11 and the ends of the whole series are brought out to the terminals 12 12ª (Fig. 1) which are carried on an insulating base 13.

As machines constructed according to this invention are intended principally for high tension working, and as it is not usually convenient to measure the full electro motive force, two special volt meter terminals 14 14ª are connected to the ends of one of the coils, the electro motive force of which can be readily taken by an ordinary low pressure volt-meter, and the full electro-motive force of the armature thus ascertained indirectly. I may however, as well understood, connect the armature coils in any other convenient manner; thus two portions may be connected parallel; or separate external circuits may be supplied from separate portions of the armature winding. The complete armature ring 1 is firmly bolted to the bedplate 15, and is or may be supported laterally by four horizontal wing stays or brackets springing from the bearing pedestals at 16, 16 and bolted to the ring 1 at the points 17, 17ª. These wing stays are shown in section at 16ᵇ in Fig. 2. The field magnet, which is the rotating part of the machine, is carried by the driving shaft 18 which runs in bearings 19 19ª. These bearings, which for magnetic reasons are preferably carried by non-magnetic seats or blocks 20, 20ª, are supported on the pedestals 15ª, 15ᵇ which rise from the bedplate 15. In Fig. 1 the pedestal 15ª and bearing carried thereby are omitted for the sake of clearness.

The field magnet usually consists of three principal parts, viz a central portion or core 21, and two end or polar portions. The core is a simple cast or wrought iron cylinder provided with flanges 22 between which is usually wound the magnetizing winding 23. It is not necessary that this winding 23 should rotate, and it may be supported in a fixed position. For structural reasons, however I prefer to rotate the winding 23, and therefore attach it to the core 21. This core so wound, is carried by the shaft 18 which passes axially through it. The end or polar portions of the magnet are of peculiar construction. Each is a circular dished casting as shown in end elevation in Fig. 1 and in vertical section in Fig. 2. From the central solid portion 24 of each of these castings spring a number of radial curved projections 25, of like polarity, forming polar extensions of the core 21, the projections at one end of the core being of opposite polarity to that of the projections at the other end of the core as in my former construction of machine hereinbefore referred to. These two series of polar extensions are curved toward and face each other, there being left between them a narrow gap in which the armature coils are fixed. In the machine illustrated, there are nine polar extensions 25 on each side of the armature. The number of such polar extensions and of armature coils, will however vary according to the size and speed of the machine, and the required periodicity of the current.

In order to prevent excessive air disturbance by the motion of the revolving field magnet, the spaces between the polar extensions are partly closed by webs or shielding pieces 26, seen in section in Fig. 2, these webs forming a part of each polar casting. Air holes 26ª are provided to allow of sufficient passage of air for ventilating and cooling purposes.

The three main portions of the field magnet are securely held together by means of the nuts 27 which engage with screwed parts of the driving shaft 18. This shaft is provided near each end with a shoulder or collar that takes into the corresponding bearings, 19, or 19ª; and the bearing blocks 20, 20ª are made capable of end adjustment to enable the proper relative position of magnet and armature to be insured. For this purpose the bearing blocks are each secured by nuts 20ᵇ, and studs 20ᶜ fixed to the standards and extending through slots in the bottom part 20ᵈ of the bearing block as shown in Fig. 2.

As the magnetizing winding 23 rotates with the magnet, it is necessary to provide means for connecting the said winding with the source of excitation, which may be a separate direct current machine, or a portion or the whole of the armature coils. In the latter case a commutator is used to redress or commute the alternate currents, in a manner well understood. The arrangement for passing the exciting current to the winding 23 comprises a pair of metallic rings 28 and 29 carried by the driving shaft but insulated from this shaft and from one another. The ends of the winding 23 are connected by the wires 30 and 31 to the rings 28 and 29 respectively. I may however use only one of these rings to which one end of the winding is attached, the other end of the winding being connected with the iron of the machine which is thus used as one terminal of the said winding.

On the bearing block 20 are supported two insulated studs 32, 32ª each having at one end a terminal 30ˣ for the reception of one of the wires conveying the exciting current. To the other ends of these studs are attached flexible metallic contact strips or bands 33 33ª which pass over the rings 28 and 29 respectively, and are kept in good contact with these rings by weights 34 34ª. Sometimes I attach wearing blocks of carbon or anti-friction metal to the flexible strips 33, 33ª to prevent these strips rubbing directly on the rings. By these means I secure a simple and excellent rubbing contact for the passage of the exciting current.

The armature coils of dynamo electric machines of the kind hereinbefore referred to can be so arranged as to adapt such machines to give two or more periodic electro motive forces and currents differing from one another in phase. Thus to produce two electro motive forces or currents differing by ninety degrees or a quarter period, that is to say, so that one current attains a maximum at the time the other reaches a minimum, I displace one half or other suitable proportion of the armature coils in either direction to an amount equal to one half the angular width of a single coil, and fix these coils to the supporting ring 1 in this position. Again to produce three electro motive forces or currents differing from one another in phase by any required angle or proportion of a complete period I may divide the armature coils into three equal or unequal portions. For example if three periodic currents are required differing by one-third of a period or one hundred and twenty degrees, I displace two portions of the armature coils, relatively to a third portion, the one portion being moved forward and another portion backward by an amount equal to one third of the angular width of a single coil. To enable this displacement of coils to be carried out I usually remove one coil. In the case of the two phase arrangement this leaves two vacant spaces 35 in the armature, as shown in the diagrammatic view Fig. 5 each space being equal in width to half a coil. In the three-phase arrangement, three spaces are left between the sets of coils each space being equal in width to a third of a coil if the currents are to differ by one third of a period, or one hundred and twenty degrees. These vacant spaces may be filled up by distance pieces 35ª of suitable material, for example slate or porcelain, or by small coils 35ᵇ that can be used for any subsidiary purpose. When such multiple phase machines are used as generators, the currents produced may be conveyed away by means of separate pairs of wires for each portion of the armature as indicated in full lines in Fig. 5, or three wires may be used for two phase currents as indicated in dotted lines in the said figure, one wire being common to two circuits, and so on. Thus for two windings I may use three mains instead of four, and for three windings I may use four mains instead of six.

It will be understood that machines constructed as described, whether single or multiple phase, are suitable for use as generators or motors.

What I claim is—

1. In a dynamo electric machine of the type herein referred to, a laterally detachable armature coil, such as 2, a pair of plates between which the outer end only of said coil is clamped, and bolts extending through said plates and coil, projecting laterally from one side thereof, and adapted to be secured to an armature supporting frame, substantially as herein described for the purpose specified.

2. In a dynamo electric machine of the type herein referred to, an armature comprising a supporting frame, a series of laterally detachable coils, plates between which said coils are clamped at their outer ends only, and horizontal bolts connecting said plates and coils and having extensions adapted to be secured to said frame, some of said plates being formed with holes for the passage of the ends of the corresponding coil, substantially as herein described.

3. In a dynamo electric machine, an armature comprising a supporting frame and a series of laterally detachable and radially adjustable armature coils secured near their outer ends to said frame, substantially as herein described.

4. In a dynamo electric machine, an armature comprising a supporting frame having an inwardly projecting flange, a series of armature coils laterally attached to and radially adjustable on said flange, and a series of screws arranged between said frame and the outer ends of said coils, and each adapted to adjust the radial position of the corresponding coil, substantially as herein described.

5. In a dynamo electric machine, an armature comprising a stationary non-magnetic supporting ring having an inwardly projecting flange, a series of armature coils, a series of plates arranged in pairs between each of which one of said armature coils is clamped, one of the plates of each pair being formed with holes for the passage of the ends of the corresponding coil, and the other being formed with outwardly extending projections, bolts extending laterally from said coils and whereby said coils are clamped at their outer ends between said plates and secured to the side of said flange, and a series of adjusting screws, each having its shank extending through a screw threaded hole in said ring, and its head engaged with said projections substantially as herein described for the purpose specified.

6. In a dynamo electric machine, the combination of a rotary field magnet having a single winding and two series of radial curved polar extensions 25 of unlike polarity, and a stationary armature comprising a non-magnetic supporting frame having an inwardly projecting flange, and a series of coils attached by their outer ends to one side of said flange and extending into the space between the series of polar extensions substantially as herein described.

7. In a dynamo electric machine the combination of a rotary field magnet having two series of magnetic poles and a stationary armature comprising a non-magnetic supporting ring, a series of armature coils, and plates arranged in pairs between each of which one of said coils is clamped near its outer end one of the plates of each pair being formed with holes for the passage of the ends of the corresponding coil substantially as herein described.

8. In a dynamo electric machine, the combination of a rotary field magnet having two series of magnetic poles, a non-magnetic supporting frame, and an annular series of laterally detachable and radially adjustable armature coils secured near their outer ends to said frame and extending between the two series of magnetic poles substantially as herein described.

9. In a dynamo electric machine, the combination of a rotary field magnet, and a stationary armature comprising coils connected in series, one of said coils having its ends in connection with two insulated terminals, substantially as herein described for the purpose specified.

10. In a dynamo electric machine, the combination of a stationary armature comprising an annular series of coils, and a rotary field magnet having a single winding, said magnet comprising a central portion or core extending axially through said armature and dished end portions 24 each formed with a series of curved polar extensions 25, the air spaces between each series of which are closed at the outer sides for part of their length by a web or shielding piece 26 having a number of lateral openings therein, substantially as herein described for the purpose specified.

11. In a dynamo electric machine, an armature comprising an annular series of coils divided into two or more independent groups that are arranged in the same vertical plane, but are separated from each other in the circular direction to an extent less than the angular width of one or more of said coils substantially as herein described for the purpose specified.

12. A multiple phase dynamo electric machine comprising a rotary field magnet having a single winding and two series of magnetic poles and a stationary armature comprising coils secured at their outer ends to an annular non-magnetic support and arranged in two or more independent groups located in the same vertical plane between the two series of magnetic poles, the groups of coils being separated from each other in a circular direction to an angular extent less than the angular width of one or more of said coils substantially as herein described for the purpose specified.

In testimony whereof I have signed my name to this specification in the presence of two subscribing witnesses.

WILLIAM MORRIS MORDEY.

Witnesses:
  WM. THOS. MARSHALL,
  PERCY E. MATTOCKS,
*Both of 2 Pope's Head Alley, Cornhill, London, Gentn.*